United States Patent
Rinaldi et al.

(10) Patent No.: US 10,620,880 B2
(45) Date of Patent: Apr. 14, 2020

(54) USING A DELAY TIMER TO DELAY CODE LOAD OPERATIONS TO PROCESS QUEUED WRITE REQUESTS

(71) Applicant: International Business Machines Corporation, Armonk, NY (US)

(72) Inventors: Brian A. Rinaldi, Tucson, AZ (US); Clint A. Hardy, Tucson, AZ (US); Samantha A. Utter, Tucson, AZ (US); Kevin J. Ash, Tucson, AZ (US); Karl A. Nielsen, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

(21) Appl. No.: 15/900,708

(22) Filed: Feb. 20, 2018

(65) Prior Publication Data
US 2019/0258424 A1  Aug. 22, 2019

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0653* (2013.01); *G06F 3/0679* (2013.01)

(58) Field of Classification Search
CPC .... G06F 3/0659; G06F 3/0604; G06F 3/0611; G06F 3/0653
See application file for complete search history.

(56) References Cited

U.S. PATENT DOCUMENTS

| | | |
|---|---|---|
| 7,231,493 B2 | 6/2007 | Nguyen et al. |
| 8,468,318 B2* | 6/2013 | Colgrove ............... G06F 3/061 |
| | | 711/168 |
| 8,966,466 B2 | 2/2015 | Tiwari et al. |

(Continued)

OTHER PUBLICATIONS

Anonymously; "Method and System for Updating a Firmware in a High Performance Computing Cluster"; dated Sep. 25, 2013, An IP.com Prior Art Database Technical Disclosure, (online), retrieved from the Internet at URL>http://ip.com/IPCOM/000231070D; Total 3 pages.

(Continued)

*Primary Examiner* — Prasith Thammavong
*Assistant Examiner* — Edmund H Kwong
(74) *Attorney, Agent, or Firm* — David W. Victor; Konrad Raynes Davda & Victor LLP

(57) ABSTRACT

Provided are a computer program product, system, and method for using a delay timer to delay code load operations to process queued write requests. A code load is performed to a selected storage device in a storage array comprised of a plurality of the storage devices. Writes are queued to the storage array in a non-volatile storage while performing the code load. A determination is made as to whether the queued writes to the storage array exceed a threshold. A delay timer is started in response to determining that the queued writes to the storage array exceed the threshold. An additional code load is initiated to an additional selected storage device in the storage array in response to determining that the delay timer has expired. The additional code load is initiated to the additional selected storage device in response to determining that the queued writes are less than the threshold.

23 Claims, 4 Drawing Sheets

(56) References Cited

U.S. PATENT DOCUMENTS

| | | |
|---|---|---|
| 9,092,297 B2 | 7/2015 | Armstrong et al. |
| 2012/0260242 A1 | 10/2012 | Nguyen et al. |
| 2013/0268922 A1 | 10/2013 | Tiwari et al. |

OTHER PUBLICATIONS

Anonymously; "A System and Method of Policy-Based Autonomous Firmware Update"; dated May 3, 2012, An IP.com Prior Art Database Technical Disclosure, (online), retrieved from the Internet at URL> http://ip.com/IPCOM/000217115D, Total 15 pages.

Anonymously; "System to Minimize Data Transfer Between Consecutive Firmware Updates"; dated Apr. 28, 2010, An IP.com Prior Art Database Technical Disclosure, http://ip.com/IPCOM/000195304D; Total 4 pages.

IBM; "System to Efficiently Resume Interrupted Firmware Updates"; dated Mar. 3, 2009, An IP.com Prior Art Database Technical Disclosure, (online), retrieved from the internet at URL>http://ip.com/IPCOM/000179953D; Total 4 pages.

\* cited by examiner

Code Load Information

Write Queue Information

USING A DELAY TIMER TO DELAY CODE LOAD OPERATIONS TO PROCESS QUEUED WRITE REQUESTS

BACKGROUND OF THE INVENTION

1. Field of the Invention

The present invention relates to a computer program product, system, and method for using a delay timer to delay code load operations to process queued write requests.

2. Description of the Related Art

A storage array, such as a Redundant Array of Independent Disks (RAID), is configured in a plurality of storage devices. During a code load operation to update the code, e.g., firmware, in one of the storage devices in the storage array, write requests are queued in a write queue and delayed until the code load to the storage device completes. Reads to the storage array may continue to be processed, such as preemptive reconstruct reads (PER), by rebuilding data for the read on the storage device subject to the code load from parity data for the storage array. However, writes remain buffered in a write cache during the code load to the storage device. The buffering of the write requests may cause the write cache to become full, which would prevent further writes from being accepted until buffered write requests are processed.

To avoid the write cache from reaching maximum capacity, a percentage of the write cache may be devoted to writes to the storage array configured in a storage device subject to the code load, and if that percentage of the write cache becomes full, then the system will stop accepting writes for that storage array involved in the code load.

There is a need in the art for improved techniques for performing a code load to storage devices in which storage arrays are configured to avoid the write cache from becoming full and unavailable to accept more write requests.

SUMMARY

Provided are a computer program product, system, and method for using a delay timer to delay code load operations to process queued write requests. A code load is performed to a selected storage device in a storage array comprised of a plurality of the storage devices. Writes are queued to the storage array in a non-volatile storage while performing the code load. A determination is made as to whether the queued writes to the storage array exceed a threshold. A delay timer is started in response to determining that the queued writes to the storage array exceed the threshold. An additional code load is initiated to an additional selected storage device in the storage array in response to determining that the delay timer has expired. The additional code load is initiated to the additional selected storage device in response to determining that the queued writes are less than the threshold.

DETAILED DESCRIPTION

During code load operations, queued writes may fill the write cache and reach a level where writes may no longer be accepted to a rank. The write cache buffer may need time to drain and process writes between code loads to avoid a situation where the write queue buffer reaches a level where no more writes may be accepted. Allowing too much delay between code loads may extend out the time to perform the code load operations on numerous storage devices in the storage system, thus resulting in an unduly long code load period. For this reason, inserting a constant delay time between code loads may cause unnecessary delays in processing code loads.

Described embodiments provide improvements to computer technology for code load operations by applying dynamic delay times between code loads of storage devices in a storage system. The disclosed embodiments provide improvements to computer technology to dynamically adjust the period of delay between code loads based on the level of writes queued in the write cache. With described embodiments, the delay time between code loads is reduced when the level of queued writes is below thresholds used to determine when the level of queued writes increases the risk of filling the write buffer. Further, the delay may be increased or lengthened if the level of queued writes exceeds the threshold and risks filling the write cache to unacceptable levels. In further embodiments, the delay may be dynamically adjusted by adjusting the delay timer or considering additional thresholds, such as whether queued writes exceed an initial buffered write count at the storage array before the code load and/or if the queued writes exceed the threshold. Still further, queued writes may be reduced by reducing the number of storage devices concurrently subject to a code load operation if the queued writes exceed one or more thresholds, or the number of storage devices concurrently subject to the code load may be increased if the number of queued writes is sufficiently low.

Figure 1:
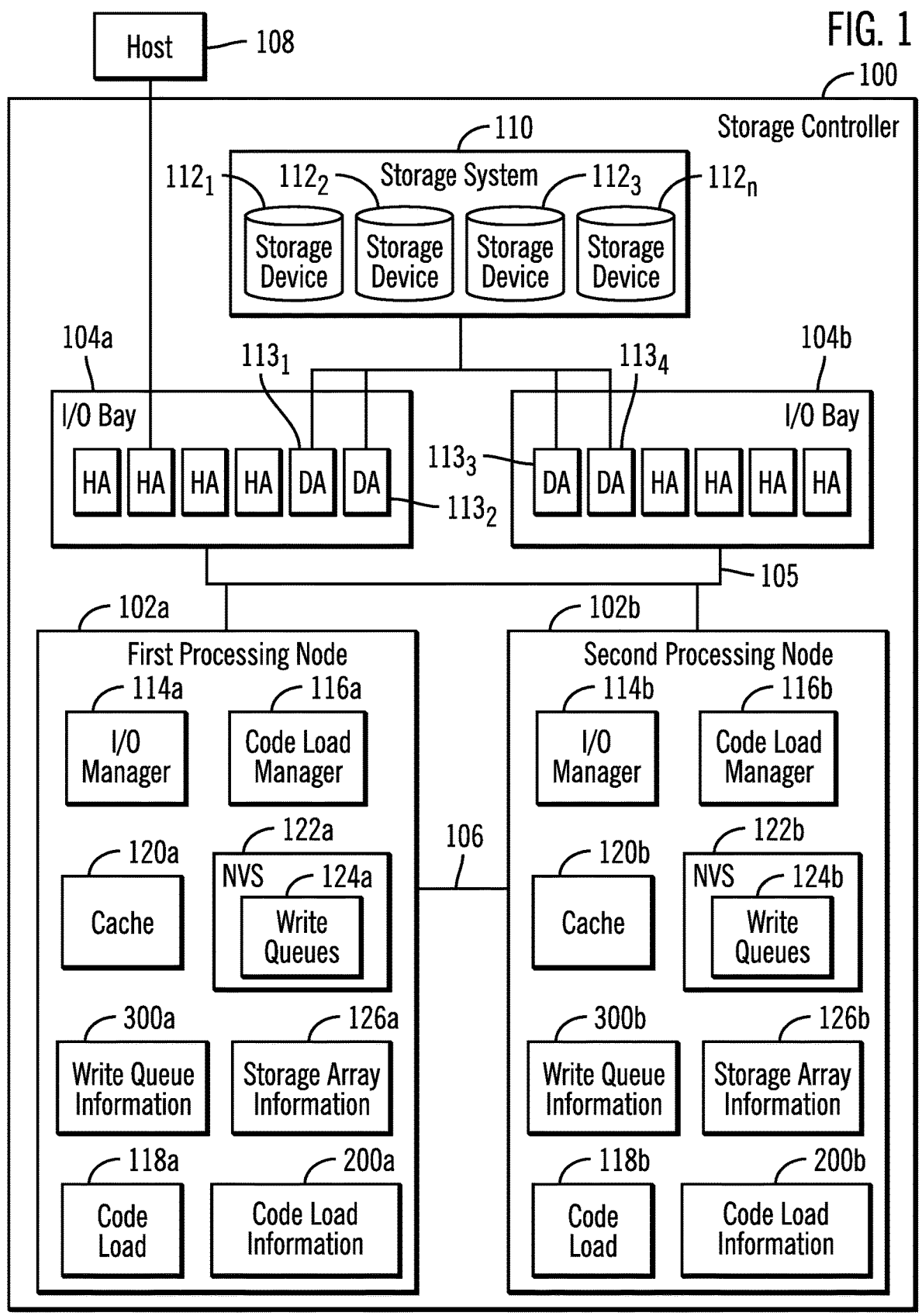
FIG. 1 illustrates an embodiment of a storage controller.

FIG. 1 illustrates an embodiment of a storage controller 100 including a plurality of independent processing nodes 102a,102b, such as a central electronics complex (CEC), that each connect to Input/Output (I/O) bays 104a, 104b having device adaptors (DA) and hardware adaptors (HA) therein, over a bus interface 105, such as a Peripheral Component Interconnect Express (PCIe) bus. The processing nodes 102a, 102b may also communicate with each other directly over a link 106, such as a PCIe bus. Host systems, such as host 108, may connect to the storage controller 100 through a host adaptor (HA) in the I/O bays 104a, 104b.

A storage system 110 includes a plurality of storage devices $112_1 \ldots 112_n$, in which tracks, logical volumes, ranks of logical contiguous storage spaces, and storage arrays, such as Redundant Arrays of Independent Disks (RAID), may be configured. Each processing node 102a, 102b is assigned one of the device adaptors in each of the I/O bays 104a, 104b that connect to the storage array 110 to provide access to data configured in the storage devices 112. Each processing node 102a, 102b has a default configuration to communicate with a device adaptor (DA) $113_1$, $113_2$, $113_3$, $113_4$ in one of the I/O bays 104a, 104b, where the default configuration will assign the different processing nodes 102a, 102b to device adaptors in the I/O bays 104a, 104b.

Each processing node 102a, 102b includes an I/O manager 114a, 114b to manage I/O requests from attached hosts 108 to storage arrays configured in the storage devices $112i \ldots 112n$, and perform other related operations, such as path selection and error handling. Each processing node 102a, 102b further has a code load manager 116a, 116b to apply a code load 118a, 118b, comprising an update to firmware, software, etc., for the storage devices $112_1 \ldots 112_n$. Each processing node 102a, 102b maintains code load information 200a, 200b having information used to manage the deployment of the code load 118a, 118b to the storage devices $112_1 \ldots 112_n$.

Each processing node 102a, 102b further includes a cache 120a, 120b to cache tracks from the storage devices $112_1 \ldots 112_n$ and a non-volatile storage ("NVS") 122a, 122b to provide a backup storage of modified tracks in the other cache 120b, 120a, respectively. The NVSs 122a, 122b may each maintain write queues 124a, 124b, where each write queue $124_i$ is to queue writes to one of the storage arrays configured in the storage devices $112_1 \ldots 112_n$. There may be one write queue $124_i$ for each rank configured in the storage devices $112_1 \ldots 112_n$, wherein there is one rank for each storage array (e.g., RAID array). In this way, there may be one write queue $124_i$ for each of the storage arrays.

Each processing node 102a, 102b may be assigned groups of the storage arrays configured in the storage devices $112_1 \ldots 112_n$. Each processing node 102a, 102b includes storage array information 126a, 126b having information on the storage arrays assigned to that processing node 102a, 102b, respectively. Each processing node 102a, 102b also includes write queue information 300a, 300b having information on the write queues 124a, 124b, where each write queue of the write queues 124a, 124b buffers writes for one rank or storage array configured in a rank.

In the embodiment of FIG. 1, two redundant processing nodes 102a, 102b and two I/O bays 104a, 104b are shown. In further embodiments, there may be more than the number of shown redundant elements 102a, 102b, 104a, 104b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1 \ldots 112_n$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1 \ldots 112_n$, such as Just a Bunch of Disks (JBOD), Direct Access Storage Device (DASD), Redundant Array of Independent Disks (RAID) array, virtualization device, etc. Further, the storage devices 112 in the system 110 may comprise heterogeneous storage devices from different vendors and different types of storage devices, such as a first type of storage devices, e.g., hard disk drives, that have a slower data transfer rate than a second type of storage devices, e.g., SSDs.

The caches 120a, 120b may comprise memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 122a, 122b may comprise a non-volatile storage, such as NAND storage, e.g., flash memory, Solid State Drive (SSD) storage, non-volatile RAM, etc. Other non-volatile devices may be used for the non-volatile storage 122a, 122b, such as a battery backed-up DIMM.

The components, such as the I/O managers 114a, 114b, host adaptors (HA), and device adaptors (DA) $113_1$, $113_2$, $113_3$, $113_4$ may be implemented in computer readable program instructions in a computer readable storage medium executed by a processor and/or computer hardware, such as an Application Specific Integrated Circuit (ASIC).

Figure 2:
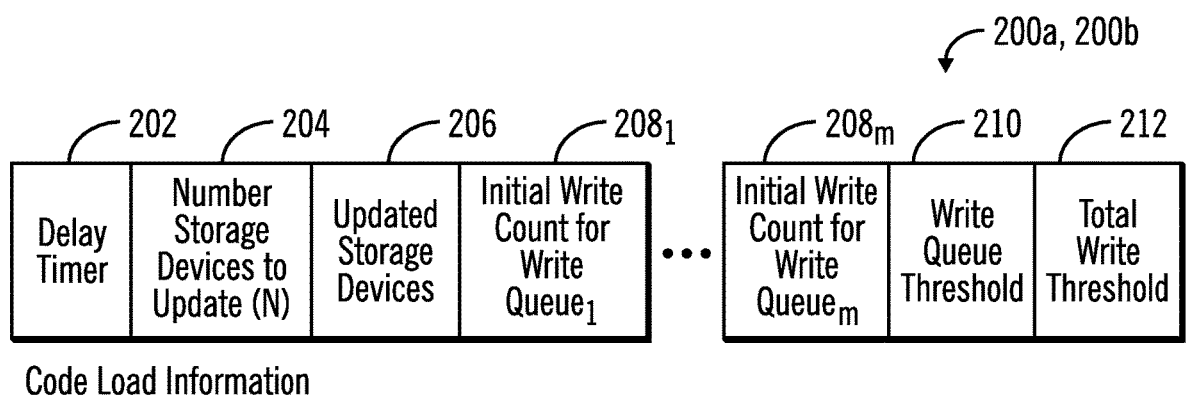
FIG. 2 illustrates an embodiment of code load information used to manage code load operations on storage devices managed by the storage controller.

FIG. 2 illustrates an embodiment of code load information 200a, 200b, and includes a delay timer 202 indicating a delay interval between code load operations at a processing node 102a, 102b to allow write requests pending in the write queues 124a, 124b to be processed and applied to the storage devices $112_1 \ldots 112_n$; a number of storage devices to update (N) 204 indicating a number of the storage devices $112_1 \ldots 112_n$ to which a code load 118a, 118b may be concurrently applied; updated storage devices 206 indicating those storage devices $112_1 \ldots 112_n$ to which the code load 118a, 118b has been applied; and an initial write count $208_1 \ldots 208_m$ for each of the write queues 124a, 124b managed by the processing node 102a, 102b comprising the write count for a write queue before the code load is initiated. The code load information 200a, 200b further indicates a write queue threshold 210, which indicates a threshold at which a write queue $124_i$ comprising one of the write queues 124a, 124b is considered to be at too high of a level such that action must be taken to reduce the number of queued writes in the write queue $124i$. The code load information 200a, 200b further indicates a total write threshold 212 which indicates a threshold at which the total writes in all the write queues 124a, 124b is considered to be at too high of a level such that action must be taken to reduce the number of queued writes in all the write queue 124a, 124b.

Figure 3:
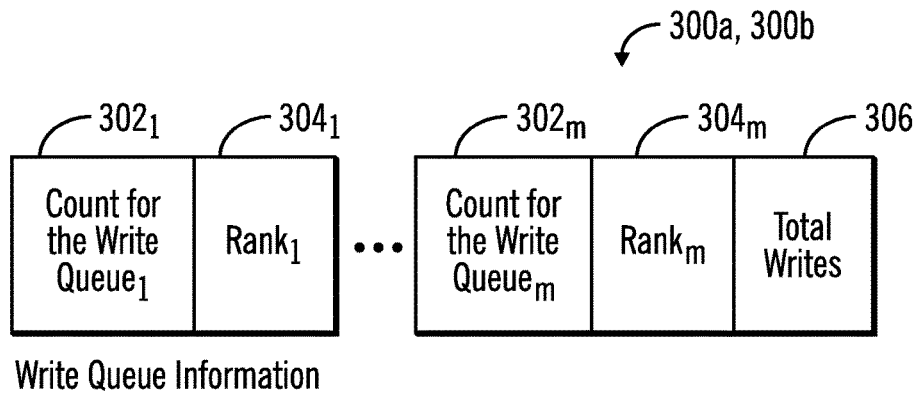
FIG. 3 illustrates an embodiment of write queue information having information on write queues buffering writes.

FIG. 3 illustrates an embodiment of the write queue information 300a, 300b for each of the processing nodes 102a, 102b having for each of the write queues 124a, 124b assigned to the processing nodes 102a, 102b a count $302_1 \ldots 302_m$ of the number of writes in the respective the write queues $124_1 \ldots 124_m$ of the write queues 124a, 124b and the rank $304_1 \ldots 304_m$ (or storage array) for which the count is maintained. The count $302_1 \ldots 302_m$ is incremented when a write is queued in the write queue $124_1 \ldots 124_m$ for which the count $302_1 \ldots 302_m$ is maintained. The write queue information further has a total writes 306 indicating a count of all the writes for the write queues 124a, 124b ($124_1 \ldots 124_m$) maintained by the processing node 102a, 102b, respectively.

Figure 4:
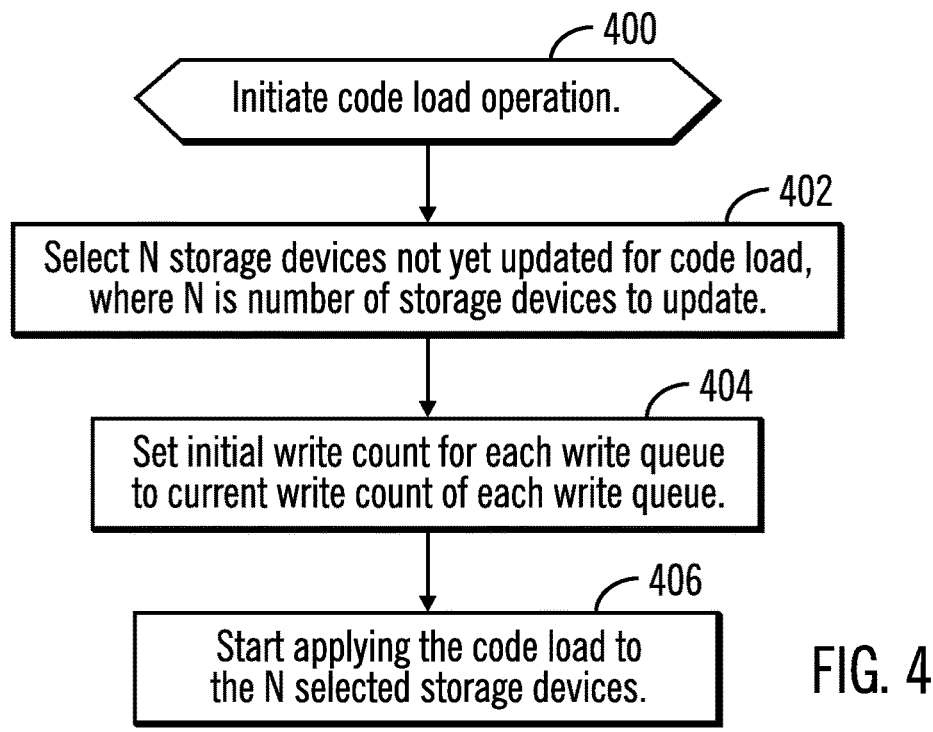
FIG. 4 an embodiment of operations to initiate a code load operation.

FIG. 4 illustrates an embodiment of operations performed by the code load manager 116a, 116b to apply the code load 118a, 118b to a set of N of the storage devices $112_1 \ldots 112_n$ comprising less than all the storage devices $112_1 \ldots 112_n$ which have not been updated. Upon initiating (at block 400)

a code load, the code load manager 116a, 116b selects (at block 402) N of the storage devices $112_1 \ldots 112_n$ and sets (at block 404) the initial write count $208_1 \ldots 208_m$ for all the write queues $124_1 \ldots 124_m$ of the write queues 124a, 124b to the current write count $302_1 \ldots 302_m$ for the write queues 124a, 124b. The code load manager 116a, 116b then starts (at block 406) applying the code load 118a, 118b to the selected N of the storage devices $112_1 \ldots 112_n$.

Figure 5:
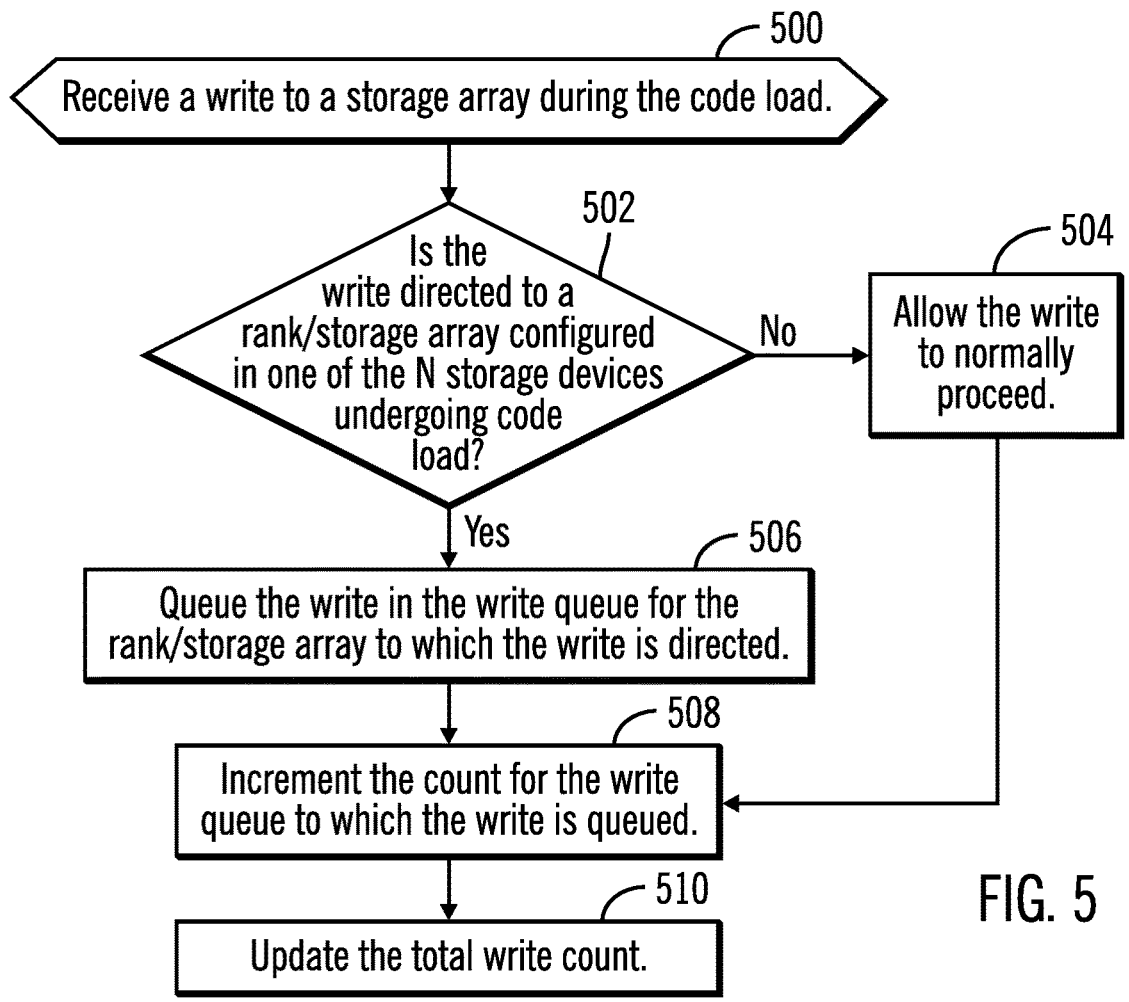
FIG. 5 an embodiment of operations to process a write to a storage array during a code load.

FIG. 5 illustrates an embodiment of operations performed by the code load manager 116a, 116b to process a write to a storage array during the code load. Upon receiving (at block 500) a write to a storage array, if (at block 502) the write is directed to a rank/storage array configured in one of the N storage devices $112_1 \ldots 112_n$ undergoing code load. If the write is not directed to a rank/storage array not configured in a storage device undergoing code load, then the write is allowed to proceed (at block 504) normally, such as adding to the write queue 124a, 124b for the rank/storage array, which write queue is being processed. If (at block 502) the write is directed to a rank/storage array configured in a storage device undergoing code load, then the write is queued (at block 506) in the write queue 124a, 124b, which is not being processed due to the code load. After queuing the write at block 504 or 506, the count $302_i$ for the write queue $124_i$ is incremented (at block 508) and the total writes 306 is incremented (at block 510). Further, for writes normally processed, the write queue count 302i for ranks/storage array not configured in a storage device being updated and the total writes 306 are decremented when processing a write from the write queue 124a, 124b.

With the embodiment of operations of FIG. 5, counts for the write queues $302_i$ and total writes 306 are updated when a write is received. The write counts $302_i$ and 306 reflect the degree to which a code load causes an increase in the number of queued writes and use of the NVS 122a, 122b. This information may then be used to determine whether to delay processing a next code load to allow writes in the write queues 124a, 124b to be processed to reduce the number of queued writes and increase free space in the NVS 122a, 122b for new writes to avoid a situation where the NVS 122a, 122b becomes full and cannot accept new writes so that fail has to be returned to write requests.

Figure 6:
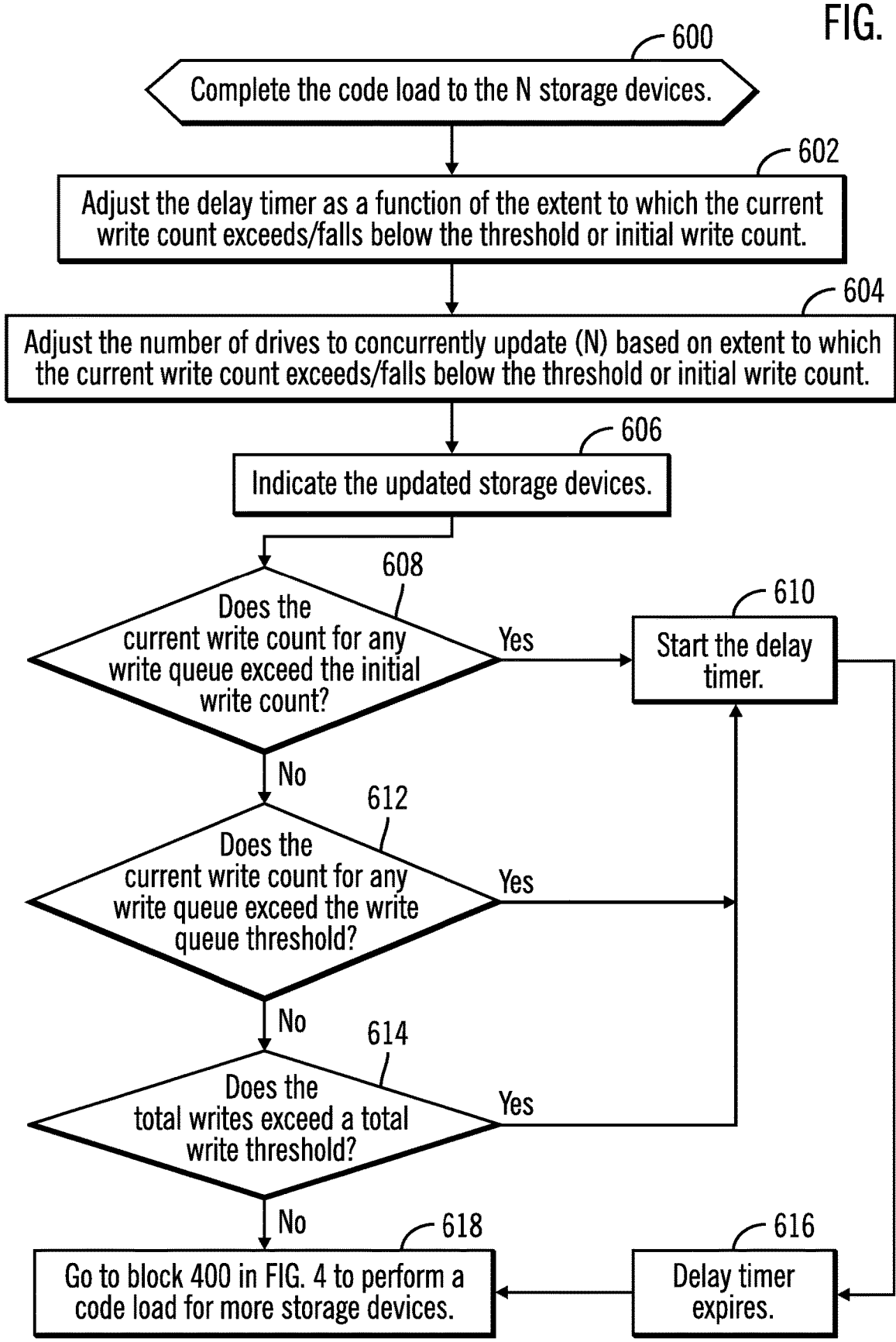
FIG. 6 illustrates an embodiment of operations to complete the code load to storage devices.

FIG. 6 illustrates an embodiment of operations performed by the code load manager 116a, 116b to process the completion of the code load at the N of the storage devices $112_1 \ldots 112_n$. Upon completing the code load at all the selected N of the storage devices $112_1 \ldots 112_n$, the code load manager 116a, 116b adjusts (at block 602) the delay timer 202 as a function of the extent to which the current write count $302_1 \ldots 302_m$ exceeds/falls below the threshold or initial write count $208_1 \ldots 208_m$ for all the storage arrays/ranks managed by the node 102a, 102b in which the code load manager 116a, 116b is executing. For instance, the function may look at the amount by which the current write count $302_i$ differs from the initial write count $208_i$ or a threshold as a percentage of the initial write count $208_i$, and adjust by that percentage increase or decrease. Other information and functions may be applied to determine how much to adjust the delay timer 202 depending on the extent of the change in writes buffered in the write queues 124a, 124b. For instance, the function may consider just the total writes 306. The code load manager 116a, 116b may also adjust (at block 604) the number of storage devices to concurrently update (N) 204 based on extent to which the current write count exceeds/falls below the threshold or initial write count. The code load manager 116a, 116b may use a function such as used to adjust the delay timer 202 to increase or decrease the number of storage devices to concurrently update 204 based on the percentage of change, so that if the number of queued writes increases during the code load and/or is above a threshold, the number of storage devices to update 204 may be decreased, whereas if the number of queued writes during the code load decreases and/or falls below the threshold, the number of storage devices to concurrently update 204 may be increased.

The code load manager 116a, 116b indicates (at block 606) the updated storage devices in the updated storage devices 206 field. If (at block 608) the current write count $302_i$ for any write queue (or the write queues for storage arrays having storage devices subject to the code load) exceed the initial write count $208_i$ for the write queue, then the delay timer 202 is started (at block 610). If (at block 608) the current write count $302_i$ for any write queue (or the write queues for storage arrays having storage devices subject to the code load) does not exceed the initial write count $208_i$ for the write queue, then the code load manager 116a, 116b determines (at block 612) whether the current write count $302_i$ for any write queue (or the write queues for storage arrays having storage devices subject to the code load) exceeds the queue threshold 210. If so, the delay timer 202 is started (at block 610). If (at block 614) the total writes 306 in the write queues 124a, 124b exceeds the total write threshold 212, then the delay timer 202 is started (at block 610). If (at block 614) the total writes 306 do not exceed the write threshold 212 or the delay timer 416 expires (at block 610), then control proceeds (at block 618) to block 400 in FIG. 4 to perform the code load operations without delaying the delay timer 202 period.

With the embodiments of FIG. 6, a determination is made after performing a code load whether the level of pending writes in the write queues exceeds an acceptable level as determined by one or more criteria, such as whether the current write count for a write queue exceeds the initial write count (at block 608), whether the current write count for a write queue exceeds a write queue threshold (210), and/or whether the total writes buffered in the NVS 122a, 122b exceed a total write threshold 212. Although FIG. 6 shows all three determinations being made at block 608, 612, and 614, any combination of one or more of these determinations or additional determinations may be made as to whether to start the delay timer 202. The delay timer 202 delays the code load operation to allow the writes in the write queues 124a, 124b to drain to reduce the number of queued writes. In this way, space frees up in the NVS 122a, 122b to avoid the situation where the write queues 124a, 124b become sufficiently full and can no longer accept writes from hosts.

In certain implementations, queuing of writes for a storage array configured in a storage device subject to a code load may affect the write queues for storage arrays (in the same or different processing node 102a, 102b) whose storage devices are not subject to a code load. For instance, writes may be copied from a source storage array to a target storage array. If the target storage is configured in a storage device subject to a code load, then not only will writes to the target storage be queued during the code load, but writes to the source storage will remain queued in the write queue and cannot be applied to the source storage because for certain copy operations, such as a point-in-time copy or copy-on-write operations where the old version is copied before updating the data, data copied from the source storage to the target storage cannot complete until the write completes to the target storage. Thus, queuing writes for a target storage during a code load to a storage device in which the target storage is configured will cause writes to a source storage to be queued even though the source storage is not configured with any storage devices involved in the code load. For this reason, certain embodiments, may determine whether other affected write queues exceed the write queue threshold and/or the initial write count, including those write queues not queuing writes for a storage array configured on the storage device experiencing the code load.

Further, in certain implementations, queuing writes for a storage array managed by one of the processor nodes 102a, 102b configured in a storage device subject to a code load may cause writes to be queued for a storage array managed by the other processor node 102b, 102a, such as the case if the target storage of a copy operation is managed by one processor node 102a and the source storage of the copy operation is managed by the other processor node 102b. For this reason, certain embodiments may determine whether any write queues exceed the write queue threshold and/or the initial write count, including those write queues not queuing writes for a storage array configured on the storage device experiencing the code load and managed by a processor node different from the processor node performing the code load. In this way, the determination of whether to start the delay timer considers write queues across processor nodes and from storage arrays other than storage arrays involved in the code load.

In this way, described embodiments provide improvements to computer technology for performing a code load across storage devices in a storage system that uses a dynamically adjustable delay timer and/or number of storage devices to concurrently update with the code load based on the extent to which the write queues exceed a threshold and/or initial write count.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for loading code into storage devices in a storage system, the computer program product comprising a computer readable storage medium having computer readable program code embodied therein that is executable to perform operations, the operations comprising:
    performing a code load to a selected storage device in a storage array comprised of a plurality of the storage devices;
    queuing writes to the storage array in a non-volatile storage while performing the code load;
    determining whether the queued writes to the storage array exceed a threshold;
    starting a delay timer in response to determining that the queued writes to the storage array exceed the threshold;
    initiating an additional code load to an additional selected storage device in the storage array in response to determining that the delay timer has expired; and
    initiating the additional code load to the additional selected storage device in response to determining that the queued writes are less than the threshold.

2. The computer program product of claim 1, wherein the operations further comprise:
    adjusting a length of the delay timer according to a function of an amount by which the queued writes exceed the threshold in response to determining that the queued writes to the storage array exceed the threshold.

3. The computer program product of claim 1, wherein the operations further comprise:
    determining writes queued for the storage array before the performing the code load, wherein the threshold comprises the determined writes queued for the storage array before the performing the code load.

4. The computer program product of claim 1, wherein the operations further comprise:
    determining an initial write count comprising writes queued for the storage array before the performing the code load,
    wherein the determining whether the queued writes to the storage array exceed the threshold comprises determining whether the queued writes exceed the threshold and the initial write count, wherein the delay timer is started in response to determining that the queued writes exceed at least one of the threshold and the initial write count, wherein the determining whether the queued writes are less than the threshold comprises determining whether the queued writes are below the threshold and below the initial write count, wherein the additional code load is initiated in response to determining that the queued writes are less than the threshold and the initial write count.

5. The computer program product of claim 1, wherein the code load is performed with respect to a plurality of selected storage devices in a plurality of storage arrays, wherein the operations further comprise:
    maintaining write queues including one write queue for each of the storage arrays, wherein the queuing of the writes comprises queuing writes to one of the storage arrays in the write queue for the storage array, wherein the determining whether the queued writes exceed the threshold comprises determining whether the queued writes in one of the write queues for one of the storage arrays exceed the threshold, wherein the delay timer is started in response to determining that the queued writes in one of the write queues exceeds the threshold.

6. The computer program product of claim 5, wherein the delay timer is started in response to one of the write queues for a storage array not involved in the code load exceeding the threshold.

7. The computer program product of claim 5, wherein the threshold comprises a write queue threshold, wherein the operations further comprise:
 determining whether a total number of writes across all the storage arrays exceed a total write threshold after completing the code load to the selected storage device; and
 starting the delay timer in response to determining that the total number of writes across all the storage arrays exceeds the total write threshold.

8. The computer program product of claim 5, wherein there are a first node and a second node, wherein each of the first and second nodes includes a non-volatile storage, wherein the first node manages a code load for a first group of the storage arrays and includes write queues for the first group of the storage arrays, wherein the second node manages a code load for a second group of the storage arrays and includes write queues for the second group of the storage arrays, and wherein each of the first and the second nodes starts the delay timer in the first node and/or the second node having queued writes in one of the write queues exceeding the threshold.

9. The computer program product of claim 5, wherein the code load is performed with respect to a first number of storage devices in which a plurality of the storage arrays are implemented, wherein the operations further comprise:
 performing a next code load with respect a second number of storage devices less than the first number of storage devices in response to determining that the queued writes in one of the write queues exceeds the threshold; and
 performing the next code load with respect a third number of storage devices greater than the first number of storage devices in response to determining that the queued writes in all the write queues is less than the threshold.

10. A system for loading code into storage devices in a storage system, comprising:
 a processor; and
 a computer readable storage medium having computer readable program code executed by the processor to perform operations, the operations comprising:
  performing a code load to a selected storage device in a storage array comprised of a plurality of the storage devices;
  queuing writes to the storage array in a non-volatile storage while performing the code load;
  determining whether the queued writes to the storage array exceed a threshold;
  starting a delay timer in response to determining that the queued writes to the storage array exceed the threshold;
  initiating an additional code load to an additional selected storage device in the storage array in response to determining that the delay timer has expired; and
  initiating the additional code load to the additional selected storage device in response to determining that the queued writes are less than the threshold.

11. The system of claim 10, wherein the operations further comprise:
 adjusting a length of the delay timer according to a function of an amount by which the queued writes exceed the threshold in response to determining that the queued writes to the storage array exceed the threshold.

12. The system of claim 10, wherein the operations further comprise:
 determining an initial write count comprising writes queued for the storage array before the performing the code load,
 wherein the determining whether the queued writes to the storage array exceed the threshold comprises determining whether the queued writes exceed the threshold and the initial write count, wherein the delay timer is started in response to determining that the queued writes exceed at least one of the threshold and the initial write count, wherein the determining whether the queued writes are less than the threshold comprises determining whether the queued writes are below the threshold and below the initial write count, wherein the additional code load is initiated in response to determining that the queued writes are less than the threshold and the initial write count.

13. The system of claim 10, wherein the code load is performed with respect to a plurality of selected storage devices in a plurality of storage arrays, wherein the operations further comprise:
 maintaining write queues including one write queue for each of the storage arrays, wherein the queuing of the writes comprises queuing writes to one of the storage arrays in the write queue for the storage array, wherein the determining whether the queued writes exceed the threshold comprises determining whether the queued writes in one of the write queues for one of the storage arrays exceed the threshold, wherein the delay timer is started in response to determining that the queued writes in one of the write queues exceeds the threshold.

14. The system of claim 13, wherein the delay timer is started in response to one of the write queues for a storage array not involved in the code load exceeding the threshold.

15. The system of claim 13, wherein there are a first node and a second node, wherein each of the first and second nodes includes a non-volatile storage, wherein the first node manages a code load for a first group of the storage arrays and includes write queues for the first group of the storage arrays, wherein the second node manages a code load for a second group of the storage arrays and includes write queues for the second group of the storage arrays, and wherein each of the first and the second nodes starts the delay timer in the first node and/or second node having queued writes in one of the write queues exceeding the threshold.

16. The system of claim 13, wherein the code load is performed with respect to a first number of storage devices in which a plurality of the storage arrays are implemented, wherein the operations further comprise:
 performing a next code load with respect a second number of storage devices less than the first number of storage devices in response to determining that the queued writes in one of the write queues exceeds the threshold; and performing the next code load with respect a third number of storage devices greater than the first number of storage devices in response to determining that the queued writes in all the write queues is less than the threshold.

17. A method for loading code into storage devices in a storage system, comprising:
performing a code load to a selected storage device in a storage array comprised of a plurality of the storage devices;
queuing writes to the storage array in a non-volatile storage while performing the code load;
determining whether the queued writes to the storage array exceed a threshold;
starting a delay timer in response to determining that the queued writes to the storage array exceed the threshold;
initiating an additional code load to an additional selected storage device in the storage array in response to determining that the delay timer has expired; and
initiating the additional code load to the additional selected storage device in response to determining that the queued writes are less than the threshold.

18. The method of claim 17, further comprising:
adjusting a length of the delay timer according to a function of an amount by which the queued writes exceed the threshold in response to determining that the queued writes to the storage array exceed the threshold.

19. The method of claim 17, further comprising:
determining an initial write count comprising writes queued for the storage array before the performing the code load,
wherein the determining whether the queued writes to the storage array exceed the threshold comprises determining whether the queued writes exceed the threshold and the initial write count, wherein the delay timer is started in response to determining that the queued writes exceed at least one of the threshold and the initial write count, wherein the determining whether the queued writes are less than the threshold comprises determining whether the queued writes are below the threshold and below the initial write count, wherein the additional code load is initiated in response to determining that the queued writes are less than the threshold and the initial write count.

20. The method of claim 17, wherein the code load is performed with respect to a plurality of selected storage devices in a plurality of storage arrays, further comprising:
maintaining write queues including one write queue for each of the storage arrays, wherein the queuing of the writes comprises queuing writes to one of the storage arrays in the write queue for the storage array, wherein the determining whether the queued writes exceed the threshold comprises determining whether the queued writes in one of the write queues for one of the storage arrays exceed the threshold, wherein the delay timer is started in response to determining that the queued writes in one of the write queues exceeds the threshold.

21. The method of claim 20, wherein the delay timer is started in response to one of the write queues for a storage array not involved in the code load exceeding the threshold.

22. The method of claim 20, wherein there are a first node and a second node, wherein each of the first and second nodes includes a non-volatile storage, wherein the first node manages a code load for a first group of the storage arrays and includes write queues for the first group of the storage arrays, wherein the second node manages a code load for a second group of the storage arrays and includes write queues for the second group of the storage arrays, and wherein each of the first and the second nodes starts the delay timer in the first node and/or second node having queued writes in one of the write queues exceeding the threshold.

23. The method of claim 20, wherein the code load is performed with respect to a first number of storage devices in which a plurality of the storage arrays are implemented, further comprising:
performing a next code load with respect a second number of storage devices less than the first number of storage devices in response to determining that the queued writes in one of the write queues exceeds the threshold; and
performing the next code load with respect a third number of storage devices greater than the first number of storage devices in response to determining that the queued writes in all the write queues is less than the threshold.

* * * * *